Nov. 11, 1930.  W. W. HODGSON  1,781,583
HANDLE GRIP FOR PAILS
Filed April 5, 1929
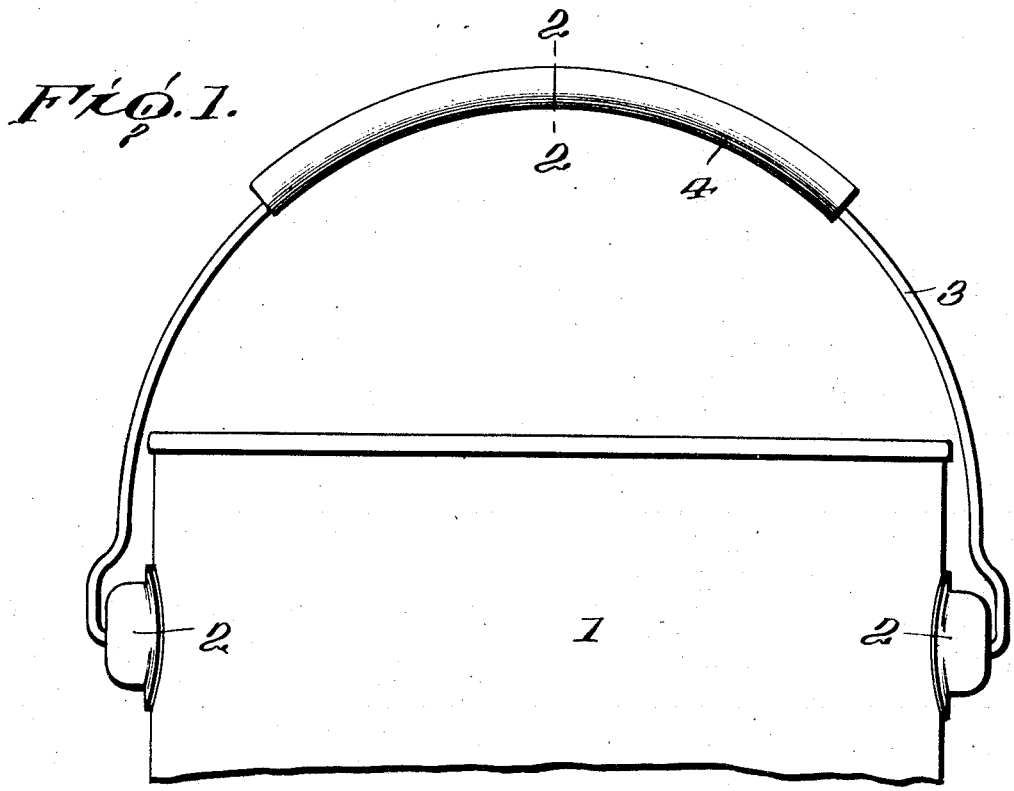
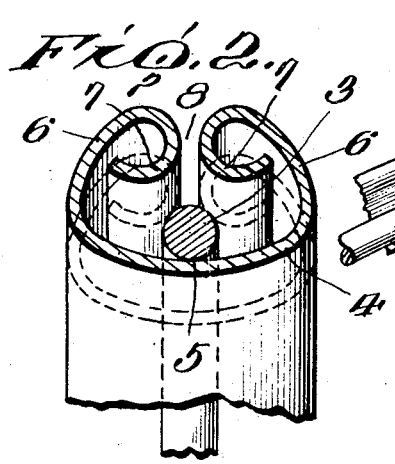
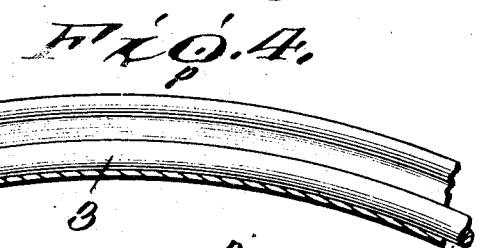
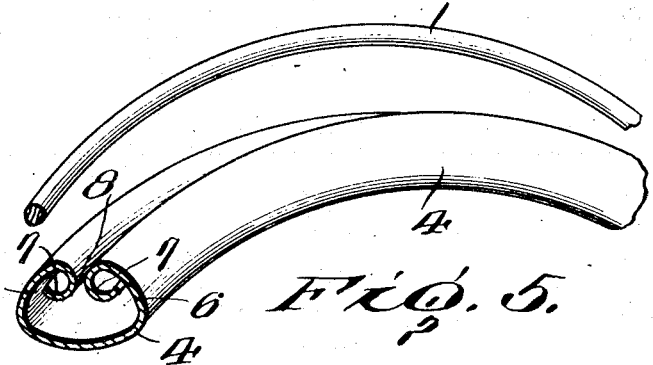
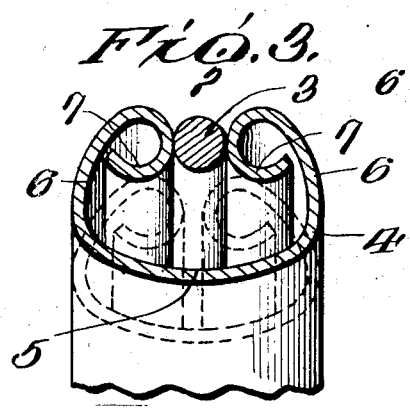
Inventor
William W. Hodgson,
By
Stuyvesant & Mason,
Attorneys.

Patented Nov. 11, 1930

1,781,583

UNITED STATES PATENT OFFICE

WILLIAM W. HODGSON, OF CHICAGO, ILLINOIS, ASSIGNOR TO CONTINENTAL CAN COMPANY, INC., OF NEW YORK, N. Y., A CORPORATION OF NEW YORK

HANDLE GRIP FOR PAILS

Application filed April 5, 1929. Serial No. 352,714.

The invention relates to new and useful improvements in handle grips for pails and more particularly to a handle grip which may be readily attached to the pail.

An object of the invention is to provide a handle grip which when attached to a wire bail of a pail is free to move endwise on the bail and to center itself on the bail.

A further object of the invention is to provide a handle grip of the above character wherein said grip is so constructed that it may be snapped onto the bail by a springing of the metal forming the grip and which when mounted on the bail is free to move thereon.

In the drawings:—

Fig. 1 is a side view of a portion of a pail with the improved handle grip attached thereto.

Fig. 2 is a sectional view on the line 2—2 showing in broken lines the bail wedging between the curved spaced edge portions of the grip for detaching the grip.

Fig. 3 is a view similar to Fig. 2 but showing the bail as between the spaced edge portions and springing the same apart; also showing in broken lines the grip as released from the bail.

Fig. 4 is a longitudinal sectional view through the grip showing a portion of the bail in place in the grip.

Fig. 5 is a perspective view showing the grip placed beneath the bail and positioned for lifting into engagement with the bail.

The invention is directed to a handle grip for wire bail for pails. The handle grip is made from a single sheet of metal which is bent so as to provide a curved body portion. The body portion is curved from end to end thereof to conform to the curvature of the ordinary bail or substantially so. The body portion is also substantially uniformly curved in cross section throughout. The edges of the blank are brought to the upper side of the bail and are curved inwardly into rolls. These curved edge portions are spaced from each other normally a distance slightly less than the diameter of the bail. The bail is placed against the curved edge portions and by pressing on the grip the bail can be sprung between the edge portions of the grip and thus the grip attached to the bail.

Referring more in detail to the drawings, in Fig. 1 a pail is illustrated at 1 having suitable ears 2, 2 to which a bail 3 is attached. The bail is pivotally mounted in the ears. On the bail is the improved handle grip 4. This handle grip 4 is made from a single blank of sheet metal which is curved from end to end so as to conform to the curvature of the medium size bail. The underside portion 5 of the handle grip is curved on a radius of much greater extent than the radius of the bail and extends some distance to each side of the bail. This forms a relatively broad hand contacting portion for the handle grip so that the handle grip fits nicely in the hand and distributes the pressure thereon. The side portions 6, 6 of the handle grip are also curved and these two curved faces lead into the curved face of the under portion 5.

At the extreme upper side of the handle grip the edge portions of the blank indicated at 7, 7 are curved inwardly into a roll and these edge portions are spaced from each other, thus forming a space 8 the width of which is slightly less than the diameter of the bail 3. The handle grip is placed underneath the bail and when raised the bail 3 is laid in the space at the top of the grip formed by the curved rolled edge portions and is forced in between the edge portions. These curved portions 7, 7 extend from end to end of the bail handle, and not only serve to retain the handle on the bail but form hollow reinforcing ribs throughout the length of the bail handle, which strengthen said handle and prevent the buckling of the same when lifting heavy loads.

As shown in Fig. 3 the edge portions will spring apart to allow the bail to pass between said edge portions. When the grip is fully attached to the bail, the bail is free in the grip and, therefore, the grip may slide endwise on the bail or slide to one side or the other on the lower rounded face 5. This lower rounded face 5 is, however, of uniform curvature about a center lying in the plane passing centrally through the grip and, therefore, the bail will naturally center itself midway between the side walls of the handle grip. The grip also conforms to the curvature of the bail and makes contact with the same from end to end thereof under load. When the pail with a load therein is lifted the grip has this freedom of endwise movement and also lateral movement so that there is no bending of the bail, but the grip will lift the load with substantially uniform pressure distributed all along the bail even if the pail is lifted quickly with a jerk.

As noted above the handle grip is of sufficient width so as to distribute the load well on the fingers of the bearer. If it is desired to remove the grip it may be pressed against the bail and the edges separated so that the bail can be passed between the same. Thus it is that the handle grip may be readily snapped onto the bail or snapped off of the bail when desired.

It is obvious that minor changes in the shaping of the parts may be made without departing from the spirit of the invention as set forth in the appended claim.

Having fully described my invention, what I claim as new and desire to secure by Letters Patent, is:—

A metal bail handle grip for wire bail pails comprising a metal blank shaped to form an integral handle portion of substantially uniform curving cross section and shaped from end to end thereof to conform to the curvature of the bail, the side edge portions of the blank being rolled inwardly from end to end thereof so as to form a strengthening rib throughout the length of the bail handle, said side edged portions being spaced from each other thereby forming a bail receiving recess so as to permit the bail to snap past said spaced edges into said recess, and a handle grip thereby attached to the bail.

In testimony whereof, I affix my signature.

WILLIAM W. HODGSON.